United States Patent
Ljung

(10) Patent No.: US 11,191,027 B2
(45) Date of Patent: Nov. 30, 2021

(54) AUTOMATIC POWER SAVING SELECTION BASED ON TARGET USE

(71) Applicant: SONY MOBILE COMMUNICATIONS INC., Tokyo (JP)

(72) Inventor: Rickard Ljung, Helsingborg (SE)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 16/325,425

(22) PCT Filed: Oct. 11, 2016

(86) PCT No.: PCT/IB2016/056074
§ 371 (c)(1),
(2) Date: Feb. 14, 2019

(87) PCT Pub. No.: WO2018/069746
PCT Pub. Date: Apr. 19, 2018

(65) Prior Publication Data
US 2019/0215773 A1    Jul. 11, 2019

(51) Int. Cl.
*H04W 52/02* (2009.01)
*H04W 88/02* (2009.01)

(52) U.S. Cl.
CPC ... *H04W 52/0261* (2013.01); *H04W 52/0277* (2013.01); *H04W 88/02* (2013.01); *Y02D 30/70* (2020.08)

(58) Field of Classification Search
CPC ......... H04W 52/0261; H04W 52/0264; H04W 52/0267; H04W 52/0274
(Continued)

(56) References Cited

U.S. PATENT DOCUMENTS

| | | | |
|---|---|---|---|
| 7,528,577 B2* | 5/2009 | Hara | H02J 7/0047 320/132 |
| 2005/0266301 A1* | 12/2005 | Smith | A61N 1/3708 429/61 |

(Continued)

FOREIGN PATENT DOCUMENTS

| | | |
|---|---|---|
| GB | 2529857 A | 3/2016 |
| WO | 2015102447 A1 | 7/2015 |

OTHER PUBLICATIONS

International Search Report and Written Opinion from corresponding International Patent Application No. PCT/IB2016/056074, dated Jun. 28, 2017.

(Continued)

*Primary Examiner* — Kiet M Doan
(74) *Attorney, Agent, or Firm* — Tucker Ellis LLP

(57) ABSTRACT

The disclosure relates to a method for power management in a battery powered device, wherein the battery powered device comprises a one or more power saving functionalities that are either activated or deactivated on the device, the method comprising: receiving a target battery life, comparing the target battery life with a retrieved time threshold, upon determining whether the target battery life exceeds the retrieved time threshold, selectively activating at least one power saving functionalities from the one or more power saving functionalities. The method may be advantageous as it may allow a user defining a target battery life during which the battery powered device should be able to operate without running out of power.

18 Claims, 3 Drawing Sheets

(58) Field of Classification Search
USPC .................................. 702/63; 429/50, 306
See application file for complete search history.

(56) References Cited

U.S. PATENT DOCUMENTS

| | | | |
|---|---|---|---|
| 2007/0035290 A1* | 2/2007 | Schweigert | H02J 3/32 324/142 |
| 2008/0057894 A1* | 3/2008 | Aleksic | H04W 52/0277 455/187.1 |
| 2009/0164152 A1 | 6/2009 | Creus et al. | |
| 2009/0249095 A1 | 10/2009 | Poornachandran | |
| 2010/0253289 A1 | 10/2010 | Amir | |
| 2011/0022868 A1* | 1/2011 | Harchol-Balter | G06F 1/3203 713/323 |
| 2012/0108224 A1* | 5/2012 | Cheng | H04W 52/0261 455/418 |
| 2012/0277832 A1* | 11/2012 | Hussain | G01R 31/392 607/62 |
| 2014/0024416 A1* | 1/2014 | Xie | H04W 52/0261 455/574 |
| 2014/0126441 A1 | 5/2014 | Rai | |
| 2014/0215497 A1* | 7/2014 | Guo | G06F 9/5094 719/320 |
| 2014/0253377 A1* | 9/2014 | Scalisi | G01S 19/34 342/357.74 |
| 2014/0370939 A1* | 12/2014 | Ritter | G01R 31/3648 455/572 |
| 2015/0164391 A1* | 6/2015 | Hernandez-Rosas | A61B 5/14532 600/365 |
| 2015/0323974 A1* | 11/2015 | Shuster | H04M 1/72563 713/320 |
| 2016/0073349 A1* | 3/2016 | Mohan | H04W 52/0251 455/426.1 |
| 2016/0209907 A1* | 7/2016 | Han | G06F 1/329 |

OTHER PUBLICATIONS

Office Action from corresponding European Patent Application No. 16791092.6, dated Oct. 19, 2020.

* cited by examiner

US 11,191,027 B2

AUTOMATIC POWER SAVING SELECTION BASED ON TARGET USE

FIELD OF THE INVENTION

The present disclosure relates to a method for power management in a battery powered device. More specifically, the disclosure relates to a method for automatic power saving based on a user target time for a battery powered device. The disclosure further relates to a battery powered device.

BACKGROUND ART

For battery powered devices, such as e.g. a smartphone, the battery lifetime could be very important for the user. Many battery powered devices require such a lot of battery power during regular use, that it has become increasingly important for the user to be aware of the battery status and the power consumption of the battery powered device.

To aid the user in managing the power requirements, many battery powered devices allow the user to manage the power consumption by adjusting settings on the battery powered device. The settings may be related to one or more functionalities that based on its configuration will result in different battery consumption. Such settings are here referred to as power saving functionalities. Each power saving functionality may have its own impact on the device performance and—if applicable—end user interface, combined with its own power consumption saving potential.

A problem with managing power saving functionalities is that it is difficult for the user to know which functionalities to activate and/or deactivate, and at which time in order to meet a target battery life. Typically, the user has to develop a methodology based on a principle of trial and error. The development of such a methodology is an unnecessary work load for most users and the result may be that many users do not activate the power saving functionalities at all.

SUMMARY

It is an object to mitigate, alleviate or eliminate one or more of the above-identified deficiencies in the art and disadvantages singly or in any combination and solve at least the above mentioned problem.

According to a first aspect, these and other problems are solved in full, or at least in part, by a method for power management in a battery powered device, wherein the battery powered device comprises one or more power saving functionalities that are either activated or deactivated on the device, the method comprising: receiving a target battery life, comparing the target battery life with a retrieved time threshold, upon determining whether the target battery life exceeds the retrieved time threshold, selectively activating at least one power saving functionalities from the one or more power saving functionalities.

According to a second aspect, there is provided a computer program product comprising a computer-readable storage medium with instructions adapted to carry out the method according to the first aspect when executed by a device having processing capability.

According to a third aspect there is provided a battery powered device comprising: one or more battery, a battery monitor entity arranged to detect data pertaining to the power level and/or power consumption of the battery, and output said data, a memory arranged for data relating to one or more power saving functionalities that can be activated and deactivated on the device, a power saving control entity configured to: retrieving a time threshold, receiving a target battery life, comparing the target battery life with the time threshold, upon determining whether the target battery life exceeds the retrieved time threshold, selectively activating at least one power saving functionalities from the one or more power saving functionalities.

The second and third aspect may generally have the same features and advantages as the first aspect.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise.

The steps of any method disclosed herein do not have to be performed in the exact order disclosed, unless explicitly stated.

BRIEF DESCRIPTIONS OF THE DRAWINGS

The inventive concept will by way of example be described in more detail with reference to the appended drawings, which shows presently preferred embodiments of the invention.

DETAILED DESCRIPTION

Figure 1:
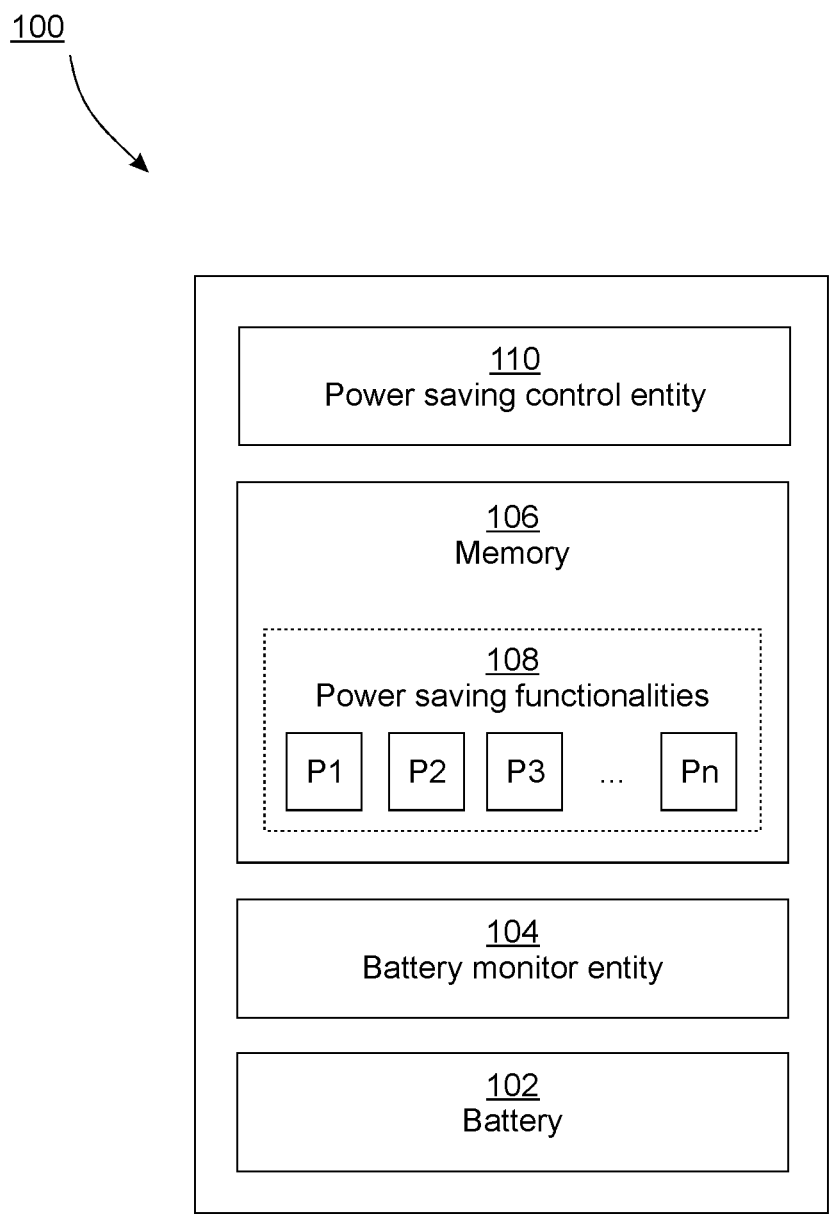
FIG. 1 shows a schematic view of a battery powered device 100 according to an embodiment.

The method as described above may be advantageous as it may allow a user defining a target battery life during which the battery powered device should be able to operate without running out of power. According to some embodiments, the user might want the battery powered device to last for 20 more hours. According to some embodiments, the user might want the battery powered device to last until 21.00 each day. With the method, the battery powered device may automatically manage the activation and/or deactivation of the power saving functionalities in the battery powered device in order to meet the battery target time. According to some embodiments, this may be achieved by comparing the target battery life with a retrieved time threshold. According to some embodiments, the retrieved time threshold may be derived by the battery powered device based on one or more parameters. According to some embodiments, the method hence utilizes an inverse problem solving methodology. Instead of allowing the user to manually configure the way the battery powered device manages the power saving functionalities, the user instructs the battery powered device to manage the power saving functionalities automatically such that the target batter life is met.

According to some embodiments, the method may further comprise retrieving an estimation of remaining battery power life of the battery powered device, wherein the retrieved time threshold is the retrieved estimation of remaining battery power life.

According to some embodiments, the estimation of remaining battery power life may comprise a first estimated battery power life, and the one or more power saving functionalities are selectively activated upon determining whether the target battery life exceeds the first estimated battery power life.

According to some embodiments, the estimation of remaining battery power life may further comprise retrieving a second estimation of the remaining battery life after activating one or more power saving functionalities upon determining whether the target battery life exceeds the first estimated battery power life, and the method further comprises: activating one or more power saving functionalities upon determining whether the target battery life exceeds the second estimation of the remaining battery life and one or more power saving functionalities are deactivated.

According to some embodiments, the estimation of remaining battery power life may further comprise retrieving a third estimation of the remaining battery life after activating one or more power saving functionalities upon determining whether the third estimated battery power life exceeds the target battery life, and the method further comprises: deactivating one or more power saving functionalities upon determining whether the third estimated battery power life exceeds the target battery life and one or more power saving functionalities are activated According to some embodiments, each power saving functionality may be associated with a priority level, and the at least one of the one or more power saving functionalities is selectively activated in an order of the priority level. This may be advantageous as it may simplify the method thus allowing the implementation of the method to have faster response and/or be less computer-intensive for the battery powered device.

According to some embodiments, the first estimated power life may be derived by: calculating a first power consumption level of the battery powered device, linearly extrapolating the first power consumption level to a point in time at which the energy in the battery powered device is zero.

According to some embodiments, the first power consumption level may be calculated using a running average of battery drainage of the battery powered device. Such a running average may be carried out using different algorithms as appreciated by the persons skilled in the art. For example, an arithmetic mean may be used. The average may be weighted differently for different parts of the time interval used for the averaging. The time interval may be different depending on the embodiment. The time internal may be allowed to be changed by the user and/or battery powered device.

According to some embodiments, each power saving functionality may be associated with a known reduction of power consumption of the battery powered device and wherein the second estimated power life is derived from linearly extrapolating the first power consumption level minus the associated reduction of power consumption of the activated one or more power saving functionalities to a point in time at which the energy in the battery powered device is zero. This may be advantageous as it may simplify the method thus allowing the implementation of the method to have faster response and/or be less computer-intensive for the battery powered device.

According to some embodiments, the second estimated power life may be derived from calculating a second power consumption level of the battery powered device, the second power consumption level being calculated when the one or more power saving functionalities selected from deactivated power saving functionalities have been activated, linearly extrapolating the second power consumption level to a point in time at which the energy in the battery powered device is zero. This may be advantageous as it may allow the estimation to be more accurate, thus allowing for the method to be more stable.

According to some embodiments, each power saving functionality may be associated with a known reduction of power consumption of the battery powered device, wherein the third estimated power life is derived from linearly extrapolating the first power consumption level plus the associated reduction of power consumption of the deactivated one or more power saving functionalities to a point in time at which the energy in the battery powered device is zero. This may be advantageous as it may simplify the method thus allowing the implementation of the method to have faster response and/or be less computer-intensive for the battery powered device.

According to some embodiments, the third estimated power life may be derived from calculating a third power consumption level of the battery powered device, the third power consumption level being calculated when the one or more power saving functionalities selected from activated power saving functionalities have been deactivated, linearly extrapolating the third power consumption level to a point in time at which the energy in the battery powered device is zero. This may be advantageous as it may allow the estimation to be more accurate, thus allowing for the method to be more stable.

According to some embodiments, the first estimated battery life may be calculated using usage statistics of the battery powered device. This may improve the method as it may allow for the battery powered device to develop over time, i.e. machine learning. Thus, by successively storing data on what happened after previous estimations of battery life, the battery powered device may be allows to make the estimations more accurate for a specific device and usage of said device.

According to some embodiments, the target battery life may be obtained from one from the list of: an input by a user, a calculated average of one or more time intervals between previous recharges of the battery powered device.

According to some embodiments, upon determining whether the target life exceeds the first estimated battery power life or the second estimated battery power life and in case all battery power saving functionalities are activated: issue an alarm. This allows for a user to be warned in case the battery powered device is predicted not to be able to meet the requested target battery time, and the user may then initiate recharging the device at a time prior to the battery target time.

According to some embodiments, the priority level of the one or more power saving functionalities may be adjustable by the user. Specifically, at least one power saving functionalities out of the one or more of power saving functionalities may be disabled by the user. This implies that some power saving functionalities may be possible to leave out, meaning that they are never activated. The method may further comprise a request for the user to accept an activation or deactivation of one or more power saving functionalities. This may be advantageous as it may allow for an improved user experience. The user may customize the way the method works on the battery powered device.

According to some embodiments, the power saving functionalities may be one or more from the list of: reduced display backlight luminance, reduced clock frequency of a processing unit (e.g. CPU, GPU etc.), reduced display resolution, reduced amount of data activities, reduced amount of sensor usage, reduced camera functionality.

The present inventive concept will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

FIG. 1 shows a battery powered device 100 according to an example embodiment. The battery powered device 100 may be for example a smartphone or a internet-of-things/machine type communication device. The battery powered device 100 comprises hardware and is software-wise equipped with an operating system and programs. The battery powered device 100 comprises one or more battery 102. The purpose of the battery is to provide the battery powered device 100 with electric power. As the battery powered device 100 is used, the energy (i.e. charge level) in the battery will decrease. At a specific time, the time being dependent on how the device is used and other factors such as temperature and the health state of the battery, the battery will be emptied from electrical energy or the provided voltage level to the device from the battery is lower than a certain value. At, or close to this time, the battery powered device will be unable to operate. Thus the battery needs regular recharging in order for the battery powered device to continue to be in operation.

For this and other purposes, the battery powered device 100 further comprises a battery monitor entity 104. The battery monitor entity 104 is arranged to detect data pertaining to the power level and/or power consumption of the battery 102. The battery monitor entity 104 is further arranged to output said data. The data may be output directly to a user of the battery powered device 100. This may, for example, be achieved by conveying the information visually, such as showing a charge level on a screen of the battery powered device 100, or via LED indicator. It may also be achieved audially, wherein the battery powered device 100 sends out an audio signal. The data may also be available for the battery powered device itself.

The battery powered device 100 further comprises a memory 106. The memory 106 is arranged for storing data relating to (e.g. calls/pointers etc.) one or more power saving functionalities 108 that can be activated and deactivated on the device. The power saving functionalities 108 are actions that the battery powered device may perform in order to affect its power consumption. Thus, if activating a power saving functionality, the power consumption will decrease when compared to the power consumption prior to activation. Likewise, if a power saving functionality is deactivated, the power consumption will increase, when compared to the power consumption prior to deactivation. The power saving functionalities may be separate program(s) or may be integrated in the operating system. A power saving functionality may comprise actions affecting both hardware and software. For example, the power saving functionalities may be one or more from the list of reduced display backlight luminance, reduced CPU clock frequency, reduced display resolution, reduced amount of data activities, reduced amount of sensor usage, reduced camera functionalities.

In prior art, as an example of configurable settings that are here referred to as power saving functionalities, a Smartphone could potentially include an ultra-stamina mode, a stamina mode, a separate adjustment possibility in the software of the screen backlight luminance as well as inactivity timer, a separate adjustment possibility of CPU clock frequency, inactivation of individual applications, configurations of camera resolution and inactivation of sensors. As another example a machine type communication device constructed to collect and store sensor data which occasionally is transmitted to a cloud service could potentially include different power consuming sensors that can be activated and inactivated, such as a motion detector, barometer and GPS receiver, as well as being able to be configured to transmit its collected and stored data with different reporting periodicity where each periodicity level can be activated or inactivated and each results in different levels of battery consumption.

The battery powered device 100 further comprises a power saving control entity 110. A purpose of the power saving control entity 110 is to control the power saving functionalities 108 by calling them. The control comprises activating and deactivating the power saving functionalities 108. The control may also comprise adjusting the power saving functionalities.

Figure 2:
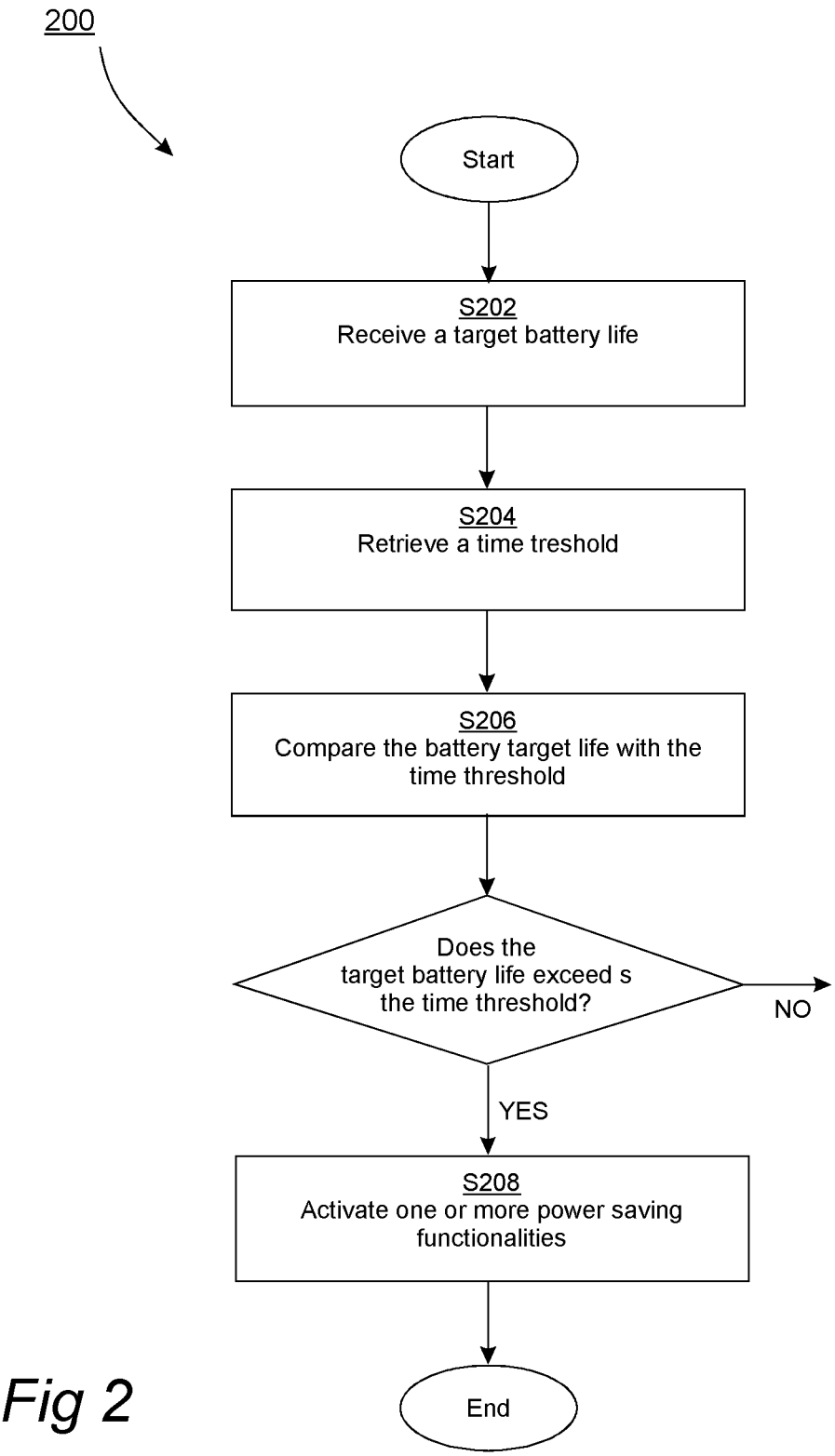
FIG. 2 shows a flow chart of a method 200 for power management in a battery powered device 100 according to an embodiment.

According to an example embodiment, a method 200 for power management in a battery powered device 100 will now be described with reference to FIG. 2. Although described for the embodiment of the battery powered device disclosed hereinabove, the method 200 is equally applicable for any other embodiments of a battery powered device conceived within the scope of the claims.

The battery powered device 100 comprises one or more power saving functionalities that are either activated or deactivated on the device. The method 200 comprises a number of steps. In a first step S202 a target battery life is received. In the embodiment, the target battery life is a time interval within which the user wishes the battery powered device 100 to be operable without having to initiate a recharging of the battery 102. The target battery life may be based on an active input from the user. For example, the user may have specified that he/she wants the battery powered device 100 to be operable at least until, 6 pm. The target battery life may, alternatively or additionally, be based on other than an active input from the user. For example, the target battery life may be based upon the user behavior, location of the battery powered device, etc.

In a next step S204 the target battery life is compared with a retrieved time threshold. The retrieved time threshold may be based on a number of things. For example, the retrieved time threshold may be based on predetermined values for mapping. In such a case, the battery powered device 100 will activate one or more power saving functionalities if the target battery life exceeds a certain value preset for example by the user or the manufacturer of the battery powered device. Alternatively, the retrieved time threshold may be based on an estimate on how long the battery powered device 100 will be operable. This implies that the usage of the battery powered device is taken into account. This may comprise a present usage, but may also comprise usage statistics covering a time period in the past, i.e. historical usage statistics. The usage statistics may comprise data such as power consumption as function of time, the number of applications running as function of time of the day, how long time interval the battery typically lasts after a recharge etc.

In an embodiment, the retrieved time threshold is derived by calculating a power consumption level of the battery powered device, linearly extrapolating the power consumption level to a point in time at which the energy in the battery powered device is zero. The power consumption level may be calculated using a running average of battery drainage of the battery powered device.

In a next step S206, the battery target life is compared with the time threshold. In case the target battery life exceeds the time threshold, at least one power saving functionalities from the one or more power saving functionalities 108 are activated S208.

According to another exemplary embodiment, the method 200 may manage also deactivation of one or more power saving functionalities. This deactivation feature is advantageous as it allows for the battery powered device 100 to fully control its current state of power consumption. Thus, the battery powered device may decrease its power consumption by activating one or more power saving functionalities and decrease its power consumption by deactivating one or more power saving functionalities.

One example of such an extended method will now be described. Thus, a method 300 for power management in a battery powered device 100 will be described with reference to FIG. 3 as an example. Although described for the embodiment of the battery powered device disclosed hereinabove, the method 300 is equally applicable for any other embodiments of a battery powered device conceived within the scope of the claims.

The battery powered device 100 comprises one or more power saving functionalities that are either activated or deactivated on the device. The method comprises several steps. In a first step S302, a target battery life is received. In a next step S304 an estimation of remaining battery power life is retrieved S304. In a next step, the target battery life is compared with the estimation of remaining battery power life.

In case S307 the target battery power life exceeds the estimation of remaining battery power life, at least one power saving functionalities from the one or more power saving functionalities 108 are activated. After this activation step S308, a new estimation of remaining battery power life is retrieved S304 and a new comparison S306 can be made to assess if the activated one or more power saving functionalities were reasonable (feedback loop FL1 in FIG. 2). More specifically, the comparison S306 can be made to assess if the activated one or more power saving functionalities were enough to meet the target battery time or not. If not, an additional one or more power saving functionalities may be activated S308 and so on.

In case S307 the target battery power life does not exceed the estimation of remaining battery power life, the purpose of the method will be met as the battery powered device 100 is now predicted to be able to meet the target battery time. However, if the power consumption of the battery powered device 100 suddenly decreases, for example because the user stops playing a game, an unnecessarily high number of power saving functionalities may be activated. This may be undesired, as each activated power saving functionality, to varying degree, decreasing the performance of the battery powered device 100.

Thus, the method further comprises the option of deactivating one or more power saving functionalities. In case the target battery power life does not exceed the estimation of remaining battery power life, at least one power saving functionalities from the one or more power saving functionalities 108 are deactivated S310. After this activation step S310, a new estimation of remaining battery power life is retrieved S304 and a new comparison S306 can be made to assess if the deactivated one or more power saving functionalities were reasonable (feedback loop FL2). More specifically, the new comparison S306 can be made to assess if the deactivation of the one or more power saving functionalities resulted in a situation where the target battery time is predicted not to be met. In case of such a scenario, the method allows for activating, in step S308, one or more power saving functionalities to allow the battery powered device 100 to meet the target battery time.

The method may further comprise an optional step S309 of omitting the deactivation step S310. A purpose of this optional step S309 may be to avoid successive activation and deactivations in the battery powered device 100 for the situation when the target battery life is close to the estimated battery life. The optional step S309 compares whether the estimated battery life exceeds the target battery life with more than a threshold. If, in step S309, the estimated battery life does exceed the target battery life with more than the threshold, the step S310 of deactivating one or more power saving functionalities is initiated. If instead, the estimated battery life does not exceed the target battery life with more than the threshold, the deactivation step S310 is not initiated. The threshold may be a time interval which may aid in setting a tolerance for the iterative method. The threshold may be for example 20 minutes but may equally well be larger or smaller. The threshold may be determined automatically but may also be based on input of the user.

Figure 3:
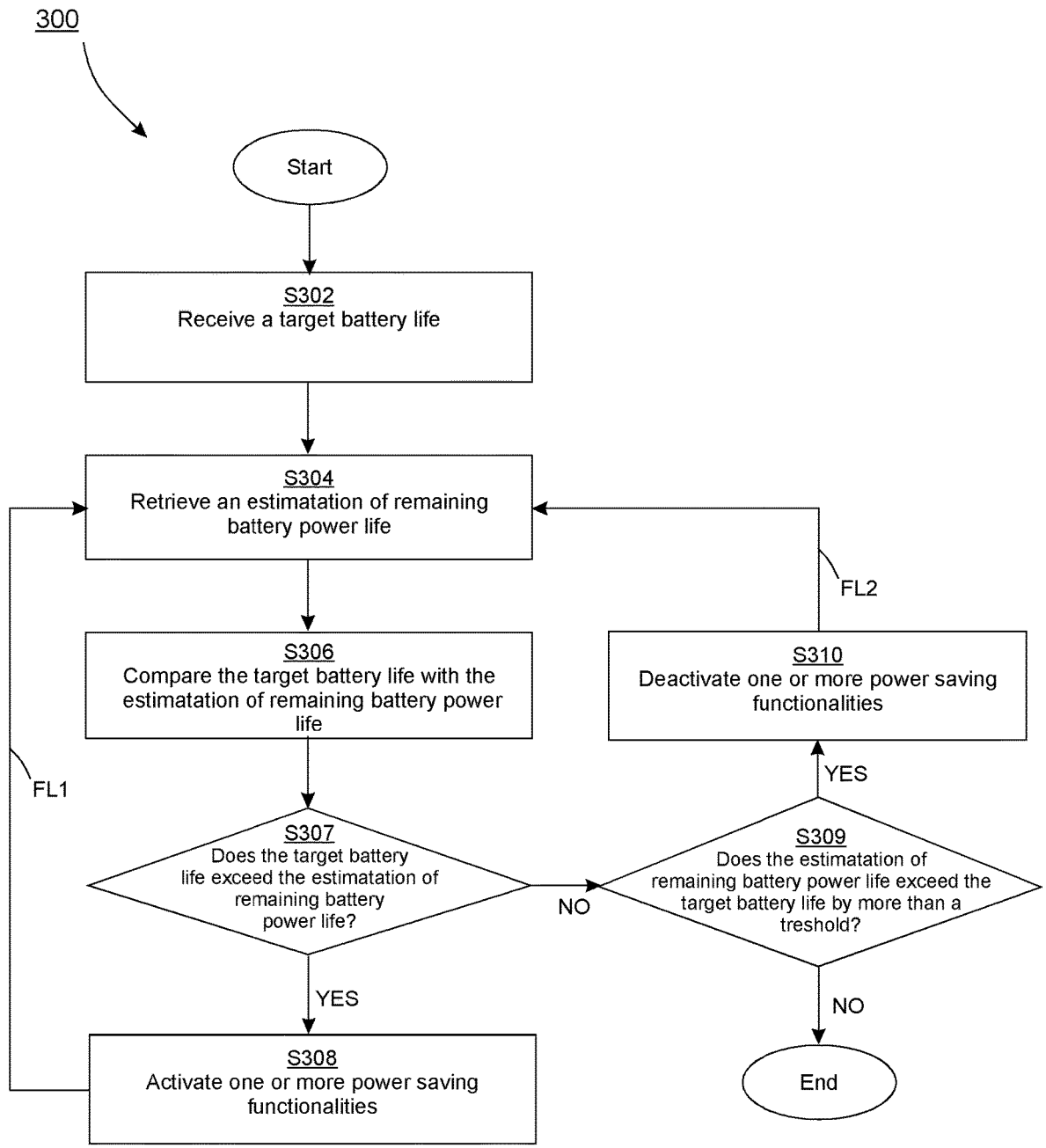
FIG. 3 shows a flow chart of a method 300 for power management in a battery powered device 100 according to an embodiment.

The method 300 described hereinabove and shown in FIG. 3 is based upon the method 200 described with reference to FIG. 2. To clarify how they are related, the method 300 will now be described in a different way.

The method 300 comprises, in an embodiment, retrieving an estimation of remaining battery power life S304 of the battery powered device 100, wherein the retrieved time threshold of the method 300 is the retrieved estimation of remaining battery power life.

In an embodiment, the estimation of remaining battery power life comprises a first estimated battery power life, and the one or more power saving functionalities are selectively activated upon determining whether the target battery life exceeds the first estimated battery power life (step S304, S306, S308).

In an embodiment, the estimation of remaining battery power life further comprises retrieving a second estimation of the remaining battery life after activating one or more power saving functionalities upon determining whether the target battery life exceeds the first estimated battery power life, and the method further comprises: activating one or more power saving functionalities upon determining whether the target battery life exceeds the second estimation of the remaining battery life and one or more power saving functionalities are deactivated. This corresponds to a situation where, after having activated one or more power saving functionalities in step S308, a new estimation is made in step S304 (feedback loop FL1 in FIG. 3) thus performing the steps once more.

In an embodiment, the estimation of remaining battery power life further comprises retrieving a third estimation of the remaining battery life after activating one or more power saving functionalities upon determining whether the third estimated battery power life exceeds the target battery life, and the method further comprises: deactivating one or more power saving functionalities upon determining whether the third estimated battery power life exceeds the target battery life and one or more power saving functionalities are activated. This corresponds to a situation where, after having activated one or more power saving functionalities in step S308, a new estimation is made in step S304 (feedback loop FL1) followed by a decision to deactivate one or more power saving functionalities in step S310. After this step, the method may comprise retrieving yet a new estimation in step S304 (feedback loop FL2 in FIG. 3).

In an exemplary embodiment, the method 300 is an iterative method. This means that it may operate continuously while the battery powered device 100 is on, and the steps of activating (step S308) or deactivating (step S310) may be carried out many times and in many different ways.

In an embodiment, each power saving functionality is associated with a priority level, and the at least one of the one or more power saving functionalities is selectively activated in an order of the priority level.

The power consumption level of the battery powered device 100 may be calculated using a running average of battery drainage of the battery powered device. For example, in an embodiment, the first power consumption level is calculated using a running average of battery drainage of the battery powered device 100.

Each power saving functionality may be associated with a known reduction of power consumption of the battery powered device. An estimation of the power life may be made by linearly extrapolating a previously retrieved power consumption level, compensating for the influence of having activated one or more power saving functionalities in an earlier step, said compensation being based upon the known reduction of power consumption associated with each power saving functionality.

Specifically, in case one or more power saving functionalities having been activated in an earlier step, an estimated power life may be derived from linearly extrapolating a power consumption level minus an associated reduction of power consumption of the activated one or more power saving functionalities to a point in time at which the energy in the battery powered device is zero. In a similar manner, in case one or more power saving functionalities having been deactivated in an earlier step, an estimated power life may be derived from linearly extrapolating a power consumption level plus an associated reduction of power consumption of the deactivated one or more power saving functionalities to a point in time at which the energy in the battery powered device is zero.

Thus, in an embodiment, each power saving functionality is associated with a known reduction of power consumption of the battery powered device 100 and wherein the second estimated power life is derived from linearly extrapolating the first power consumption level minus the associated reduction of power consumption of the activated one or more power saving functionalities to a point in time at which the energy in the battery powered device is zero.

In another embodiment, each power saving functionality is associated with a known reduction of power consumption of the battery powered device, wherein the third estimated power life is derived from linearly extrapolating the first power consumption level plus the associated reduction of power consumption of the deactivated one or more power saving functionalities to a point in time at which the energy in the battery powered device is zero.

An alternative way to derive an estimated power life is to rely on retrieving a fresh value of the power consumption after having activated or deactivated one or more power saving functionalities.

Thus, in an embodiment, the second estimated power life is derived from calculating a second power consumption level of the battery powered device, the second power consumption level being calculated when the one or more power saving functionalities selected from deactivated power saving functionalities have been activated, linearly extrapolating the second power consumption level to a point in time at which the energy in the battery powered device 100 is zero.

In another embodiment, the third estimated power life is derived from calculating a third power consumption level of the battery powered device, the third power consumption level being calculated when the one or more power saving functionalities selected from activated power saving functionalities have been deactivated, linearly extrapolating the third power consumption level to a point in time at which the energy in the battery powered device is zero.

The estimated battery life may be based upon more than a current power consumption. For example, the estimation may take into account previous usage of the battery powered device. This usage statistics may be used to predict upcoming usage of the battery powered device, hence contributing to the estimation of the battery life. In an embodiment, the first estimated battery life is calculated using usage statistics of the battery powered device. In another embodiment, the second estimated battery life is calculated using usage statistics of the battery powered device. In yet another an embodiment, the third estimated battery life is calculated using usage statistics of the battery powered device.

The target battery life may be obtained in different ways. In an embodiment, the target battery life is based upon an input by a user. In another embodiment, the target battery life is based upon a calculated average of one or more time intervals between previous recharges of the battery powered device.

There may be situations where a target battery life is estimated not to be met. This may occur when all power saving functionalities have been activated on the battery powered device, and an estimated battery life still exceeds the target battery life.

Thus, in an embodiment, upon determining whether the target life exceeds the first estimated battery power life or the second estimated battery power life and in case all battery power saving functionalities are activated: issue an alarm.

The user may be allowed to influence the way the method activates and deactivates the power saving functionalities. In an embodiment, the priority level of the one or more from the power saving functionalities is adjustable by the user. In another embodiment, the method further comprises a request for the user to accept an activation or deactivation of one or more power saving functionalities.

The power saving functionalities may comprise a number of things. Some may be purely related to software, such as closing or limiting the relative importance of, the application in the battery powered device. Others may be affecting the hardware of the battery powered device. According to an embodiment, the power saving functionalities are one or more from the list of: reduced display backlight luminance, reduced CPU clock frequency, reduced display resolution, reduced amount of background data activities.

The embodiments herein are not limited to the above described examples. Various alternatives, modifications and equivalents may be used. Therefore, this disclosure should not be limited to the specific form set forth herein. This disclosure is limited only by the appended claims and other embodiments than the mentioned above are equally possible within the scope of the claims.

The invention claimed is:

1. A method for power management in a battery powered device, wherein the battery powered device comprises one or more power saving functionalities that are each associated with a priority level and are either activated or deactivated on the device, the method comprising:
receiving a target battery life by obtaining a calculated average of one or more time intervals between previous recharges of the battery powered device, the target battery life being a time interval in which the battery powered device is operable without having to initiate a recharging;
retrieving an estimation of remaining battery power life of the battery powered device, wherein a retrieved time threshold is the retrieved estimation of remaining battery power life;
comparing the target battery life with the retrieved time threshold, the retrieved time threshold being an estimate on a length of time remaining for which the battery powered device will be operable;
upon determining that the target battery life exceeds the retrieved time threshold, selectively activating at least one power saving functionality from the one or more of power saving functionalities based on the priority level associated with the one or more power saving functionalities, wherein the priority level is adjustable by a user.

2. The method according to claim 1, wherein the estimation of remaining battery power life comprises a first estimated battery power life, and the one or more power saving functionalities are selectively activated upon determining that the target battery life exceeds the first estimated battery power life.

3. The method according to claim 2, wherein the estimation of remaining battery power life further comprises retrieving a second estimation of the remaining battery power life after activating one or more power saving functionalities upon determining that the target battery life exceeds the first estimated battery power life, the method further comprises:
upon determining that the target battery life exceeds the second estimation of the remaining battery power life and one or more power saving functionalities are deactivated, activating one or more power saving functionalities.

4. The method according to claim 3, wherein the estimation of remaining battery power life further comprises retrieving a third estimation of the remaining battery power life after activating one or more power saving functionalities upon determining that the second estimation of the remaining battery power life exceeds the target battery life, the method further comprises:
upon determining that the third estimation of the remaining battery power life exceeds the target battery life and one or more power saving functionalities are activated, deactivating one or more power saving functionalities while maintaining one or more power saving functionalities active.

5. The method according to claim 4, wherein the at least one of the one or more power saving functionalities is selectively activated in an order of the priority level.

6. The method according to claim 5, wherein each power saving functionality is associated with a known reduction of power consumption of the battery powered device, wherein the third estimation of the remaining battery power life is derived from linearly extrapolating the first power consumption level plus the associated reduction of power consumption of the deactivated one or more power saving functionalities to a point in time at which the energy in the battery powered device is zero.

7. The method according to claim 5, wherein the third estimation of the remaining battery power life is derived from calculating a third power consumption level of the battery powered device, the third power consumption level being calculated in a condition that the one or more power saving functionalities selected from activated power saving functionalities have been deactivated,
linearly extrapolating the third power consumption level to a point in time at which the energy in the battery powered device is zero.

8. The method according to claim 3, wherein each power saving functionality is associated with a known reduction of power consumption of the battery powered device and wherein the second estimation of the remaining battery power life is derived from linearly extrapolating the first power consumption level minus the associated reduction of power consumption of the activated one or more power saving functionalities to a point in time at which the energy in the battery powered device is zero.

9. The method according to claim 3, wherein the second estimation of the remaining battery power life is derived from calculating a second power consumption level of the battery powered device, the second power consumption level being calculated in a condition that the one or more power saving functionalities selected from deactivated power saving functionalities have been activated,
linearly extrapolating the second power consumption level to a point in time at which the energy in the battery powered device is zero.

10. The method according to claim 2, wherein the first estimated battery power life is derived by:
calculating a first power consumption level of the battery powered device,
linearly extrapolating the first power consumption level to a point in time at which the energy in the battery powered device is zero.

11. The method according to claim 10, wherein the first power consumption level is calculated using a running average of battery drainage of the battery powered device.

12. The method according to claim 2, wherein the first estimated battery life is calculated using usage statistics of the battery powered device.

13. The method according to claim 2, wherein the estimation of remaining battery power life further comprises retrieving a second estimation of the remaining battery power life after activating one or more power saving functionalities, the method further comprises:
determining whether the second estimation of remaining battery power life exceeds a value equal to the target battery life plus a tolerance time interval; and
upon determining that the second estimation of remaining battery power life exceeds a value equal to the target battery life plus a tolerance time interval, deactivating one or more power saving functionalities.

14. The method according to claim 1, wherein the target battery life is further obtained from an input by a user.

15. The method according to claim 1, further comprising a request for a user to accept an activation or deactivation of one or more power saving functionalities.

16. The method according to claim 1, wherein the power saving functionalities are one or more from the list of:
reduced display backlight luminance,
reduced clock frequency of a processing unit,
reduced display resolution,
reduced amount of background data activities.

17. A battery powered device comprising:
a battery;
a battery monitor entity configured to detect and output a power level and/or a power consumption of the battery;
a memory storing data relating to one or more power saving functionalities that are each associated with a priority level and can be activated and deactivated on the battery powered device; and a power saving control entity configured to:
retrieve a time threshold, the time threshold being an estimate on a length of time remaining for which the battery powered device will be operable;
receive a target battery life by obtaining a calculated average of one or more time intervals between previous recharges of the battery powered device, the target battery life being a time interval in which the battery powered device is operable without having to initiate a recharging;
compare the target battery life with the time threshold, the retrieved time threshold being an estimate on a length of time remaining for which the battery powered device will be operable;
upon determining that the target battery life exceeds the time threshold, selectively activating at least one power saving functionality from the one or more power saving functionalities based on the priority level associated with the one or more power saving functionalities, wherein the priority level is adjustable by a user.

18. A method for power management in a battery powered device, wherein the battery powered device comprises one or more power saving functionalities that are either activated or deactivated on the device, the method comprising:
receiving a target battery life by obtaining a calculated average of one or more time intervals between previous recharges of the battery powered device, the target battery life being a time interval in which the battery powered device is operable without having to initiate a recharging;
retrieving a first estimation of a length of time of remaining battery power life of the battery powered device;
comparing the target battery life with the first estimation of a length of time remaining for which the battery powered device will be operable;
upon determining that the target battery life exceeds the first estimation of remaining battery power life, selectively activating at least one power saving functionality from the one or more of power saving functionalities;
retrieving a second estimation of remaining battery power life after activating the at least one power saving functionality;
determining whether the second estimation of remaining battery power life exceeds a value equal to the target battery life plus a tolerance time interval; and
upon determining that the second estimation of remaining battery power life exceeds a value equal to the target battery life plus a tolerance time interval, deactivating one or more power saving functionalities.

* * * * *